United States Patent
Devulder et al.

(10) Patent No.: US 8,826,930 B2
(45) Date of Patent: Sep. 9, 2014

(54) FUEL TANK COMPRISING A VENTILATION SYSTEM EQUIPPED WITH A LIQUID/VAPOR SEPARATOR

(75) Inventors: Ludovic Devulder, Wavrin (FR); Ralph Pohlmann, Margny-les-Compiegne (FR); Alex Blieux, Saint-Felix (FR); Fabrice Laborde, Toulouse (FR); Philippe Lucien Valmy Georis, Chelles (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 96 days.

(21) Appl. No.: 13/125,219

(22) PCT Filed: Oct. 22, 2009

(86) PCT No.: PCT/EP2009/063873
§ 371 (c)(1),
(2), (4) Date: Apr. 20, 2011

(87) PCT Pub. No.: WO2010/046431
PCT Pub. Date: Apr. 29, 2010

(65) Prior Publication Data
US 2011/0220226 A1   Sep. 15, 2011

(30) Foreign Application Priority Data
Oct. 24, 2008   (FR) .................................. 08 57246

(51) Int. Cl.
*B60K 15/035*   (2006.01)
(52) U.S. Cl.
USPC .......................................................... 137/43
(58) Field of Classification Search
USPC .................... 137/39.43, 202, 565.22
See application file for complete search history.

(56) References Cited

U.S. PATENT DOCUMENTS

| | | | |
|---|---|---|---|
| 5,392,804 A * | 2/1995 | Kondo et al. | 137/202 |
| 5,868,119 A | 2/1999 | Endo et al. | |
| 6,336,466 B1 | 1/2002 | Ganachaud et al. | |
| 6,698,475 B2 | 3/2004 | Schaefer et al. | |
| 2001/0015513 A1 | 8/2001 | Schaftingen et al. | |
| 2005/0139260 A1* | 6/2005 | Martis et al. | 137/2 |
| 2008/0164639 A1 | 7/2008 | Criel et al. | |
| 2009/0166367 A1* | 7/2009 | Blieux et al. | 220/694 |
| 2009/0250458 A1 | 10/2009 | Criel et al. | |

FOREIGN PATENT DOCUMENTS

| | | |
|---|---|---|
| EP | 1020670 A1 | 7/2000 |
| EP | 1110697 A2 | 6/2001 |
| EP | 1216874 A2 | 6/2002 |
| EP | 1518739 A2 | 3/2005 |
| FR | 2873321 A1 | 1/2006 |
| FR | 2879122 A1 | 6/2006 |
| FR | 2900091 A1 | 10/2007 |
| JP | 10-318065 | 12/1998 |
| JP | 2008-524054 | 7/2008 |
| WO | 2007/122168 | 11/2007 |

* cited by examiner

*Primary Examiner* — John K Fristoe, Jr.
*Assistant Examiner* — Kevin E Lynn
(74) *Attorney, Agent, or Firm* — Oblon, Spivak, McClelland, Maier & Neustadt, L.L.P.

(57) ABSTRACT

Ventilation system for a fuel tank comprising a pump, an active liquid/vapor separator (LVS) that can be drained using the pump, in which a roll-over valve (ROV) that is normally open brings, by default, the internal volume of the LVS into communication with the pump and only blocks this communication when the level of fuel in the valve reaches a certain height or when the tank is tilted beyond a certain angle, or even overturned.

12 Claims, 3 Drawing Sheets

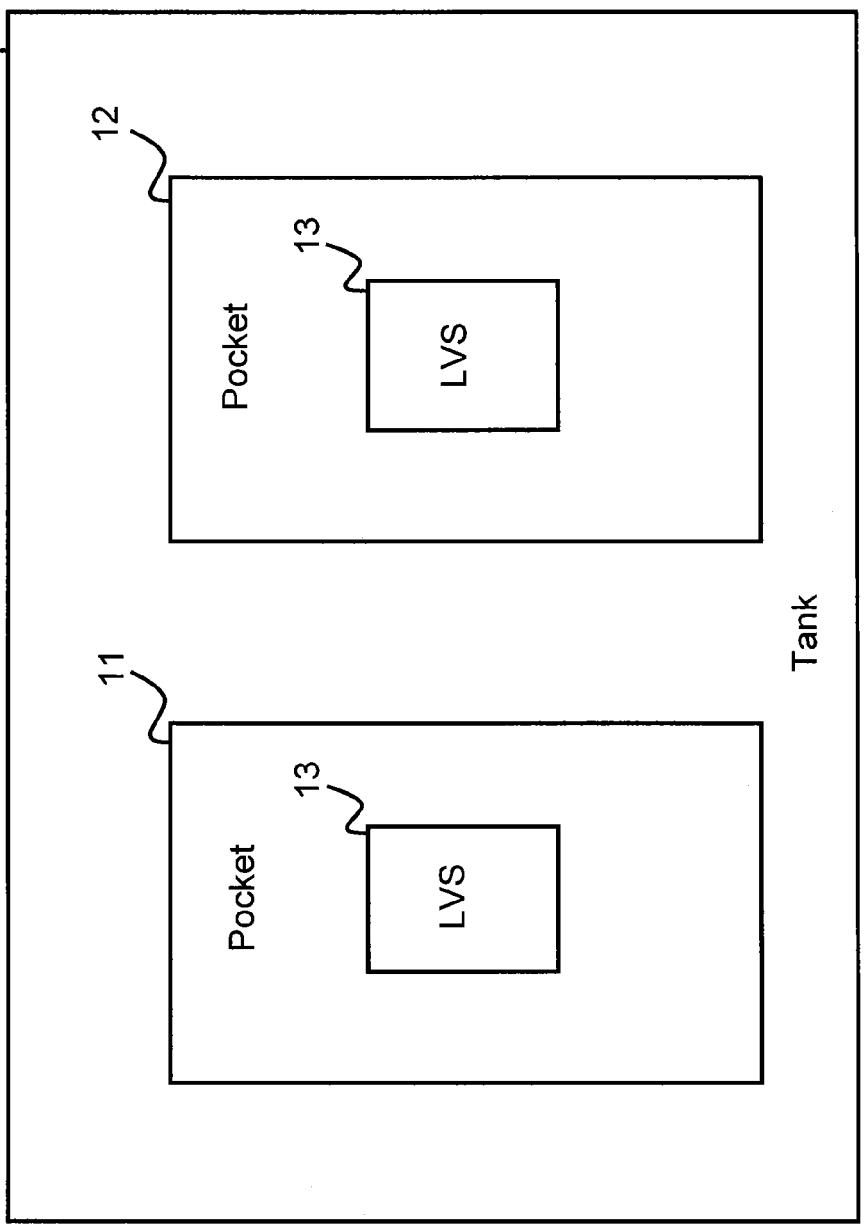

FUEL TANK COMPRISING A VENTILATION SYSTEM EQUIPPED WITH A LIQUID/VAPOR SEPARATOR

CROSS-REFERENCE TO RELATED APPLICATIONS

The present application is a U.S. national stage entry under 35 U.S.C. §371 of International Application No. PCT/EP2009/063873, filed Oct. 22, 2009, which claims priority to French Application No. 08.57246, filed Oct. 24, 2008, this application being herein incorporated by reference in its entirety for all purposes.

TECHNICAL FIELD OF THE INVENTION

The present invention relates to a fuel tank (FT) comprising a ventilation system equipped with a liquid/vapor separator (LVS).

BACKGROUND

Liquid tanks, when they are likely to be moved with the liquid that they contain, are generally equipped with a ventilation system that guarantees environmental safety when the tank is subjected to various stresses: movements in any direction and of any amplitude, thermal stresses, underpressure and overpressure.

This requirement is encountered in the case of fuel tanks, in particular when they are mounted on motor vehicles and when it is essential to prevent liquid fuel from getting out and to manage large gas pressure and volume changes when filling the tank and throughout the time that the liquid is stored in said tank.

Solutions have been developed to solve these problems that use safety valves immersed in the tank, the upper part of the valves passing through a wall of this tank. These valves generally open into a duct (or a set of ducts) leading to a box or canister containing a substance capable of trapping the liquid vapors present in the gases originating from the tank. This assembly of valves and ducts (and also optionally the canister) generally constitutes what is known as the ventilation system of the tank.

However, it is not uncommon that systems of this type have further difficulties due to the fact that, because of the particular operating circumstances, such as sudden movements or excessively high angle of tilt of the vehicle, liquid originating from the tank may nevertheless pass through the barrier of the safety valve and get into the duct leading to the canister, or even reach the latter and impair its performance.

To solve this accidental carryover of liquid out of the tank, it has been sought to retain the liquid escaping via the duct leading to the canister by interposing, in this duct, a dead volume intended to act as a vessel for collecting the liquid and for letting the vapors pass freely through. This dead volume, which is therefore part of the ventilation system, is generally known as an LVS (or liquid/vapor separator).

There are mainly two types of LVS: those referred to as "passive", which comprise in their base a simple valve that opens under the effect of the weight of liquid that they contain; and those referred to as "active", which are drained by means of an active device (a pump, for example a jet pump). The first (passive) type is of course only suitable for LVSs located in the top of the FTs, preferably above the maximum fill level or in any case: that are normally above the level of liquid in the tank. The second (active) type is also suitable for the LVSs known as "submerged" LVSs, i.e. those in which the level of liquid in the tank may reach or even exceed the level of liquid contained in the LVS.

An LVS of passive type is for example known from Patent EP 1 020 670 in the name of the Applicant. In the latter, the liquid is only discharged when the level of fuel in the tank has dropped below the low point of the LVS and when a certain amount of liquid is present in its internal volume (in order to be able to open the valve, which is at said low point, by gravity).

An LVS of active type is for example known from U.S. Pat. No. 6,698,475, where the pump that drains the LVS is a jet pump which may either be activated by a fuel return, or by a by-pass of the main pump for supplying the engine with fuel. In order to prevent, when the LVS is submerged and when the pump is at rest, liquid from going back into the LVS under the effect of hydrostatic pressure, the line connecting the LVS to the jet pump is equipped with a check valve.

Such a valve generally only opens under the effect of a certain pressure threshold (hydrostatic pressure of the liquid on top of it and/or vacuum created by the drain pump) and its sealing is even better when this threshold is high. The jet pump must therefore be sufficiently powerful to overcome this pressure threshold. In addition, a certain time is generally required in order to reach this threshold, which may impair the efficiency of the system when the vehicle is started. Finally, when the pump is at rest, the valve is closed and therefore liquid could be trapped in the LVS when the vehicle is at rest (for example, following condensation caused by a drop in temperature), possibly even in a relatively large amount, which would not be rapidly discharged when the vehicle is restarted.

SUMMARY

The objective of the present invention is especially to overcome these drawbacks by providing a ventilation system with active LVS that can be at least partly submerged in the tank depending on the level of fuel in the latter, which is automatically emptied by gravity when the engine is at rest and when the liquid level is low enough so that the LVS is not submerged, and which may be immediately and efficiently drained when the drain pump starts, said pump possibly working at a lower (and therefore less energy-consuming) pressure threshold than that of the systems of the prior art with active LVS.

For this purpose, the present invention relates to a fuel tank comprising an active LVS that can be drained using a pump, in which a roll-over valve that is normally open brings, by default, the internal volume of the LVS into communication with the pump and only blocks this communication when the level of fuel in the valve reaches a certain height or when the tank is tilted beyond a certain angle, or even overturned (function referred to as "roll over", hence the conventional name of such a valve: an ROV or roll-over valve).

Such an architecture effectively makes it possible to significantly reduce the energy consumption of the jet pump; to drain the LVS by gravity when the pump is at rest (on condition that the LVS is not submerged of course); and also allows priming of the drainage in critical situations (e.g. at altitude and/or at high temperature), the ROV not having an opening differential pressure.

BRIEF DESCRIPTION OF THE DRAWINGS

For a detailed description of the invention, reference will now be made to the accompanying drawings in which:

FIG. 3 illustrates a cross section through another variant of the invention.

DETAILED DESCRIPTION OF THE PREFERRED EMBODIMENTS

Figure 1:
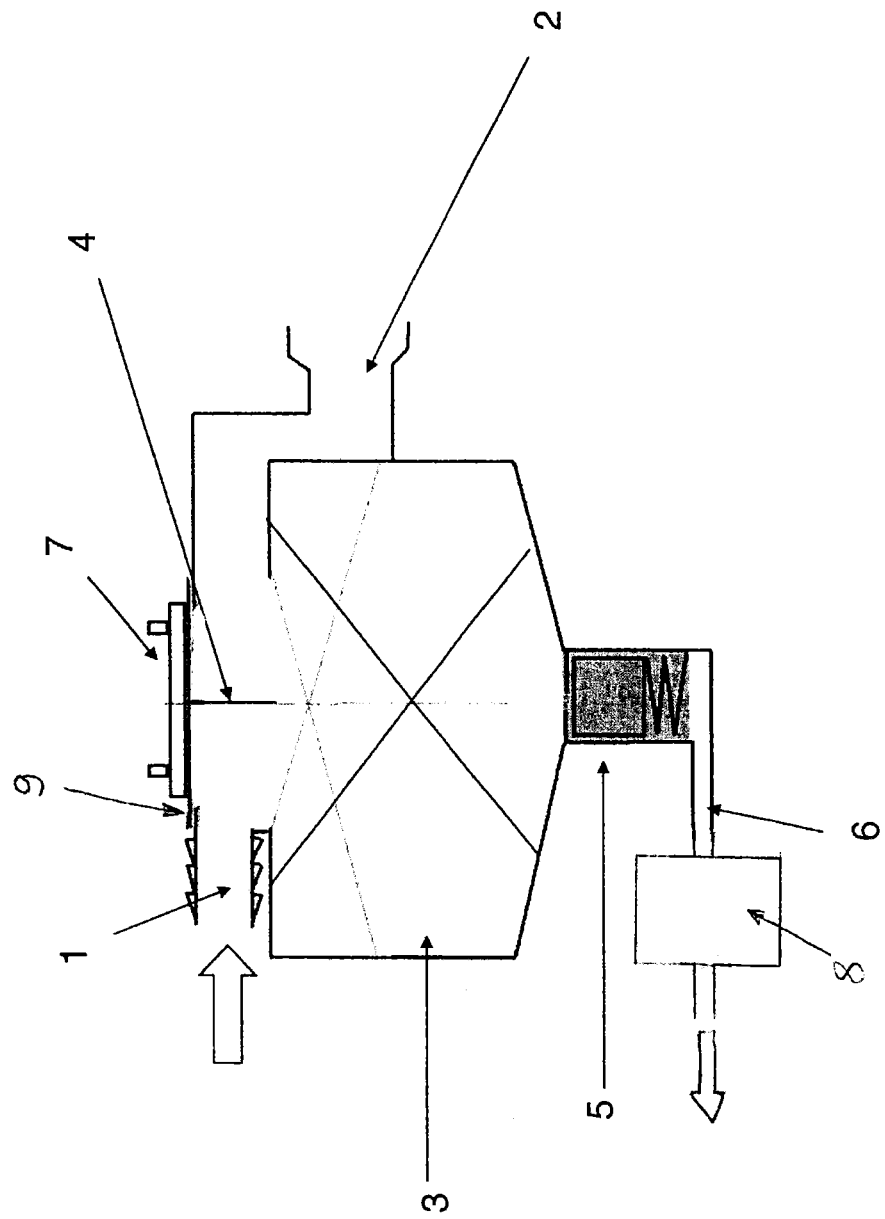
FIG. 1 illustrates a variant of the invention along an axial cross section (shown schematically) through an LVS equipped with a drain line and an ROV.

The term "fuel tank" is understood to mean an impermeable tank that can store fuel under diverse and varied environmental and usage conditions. An example of this tank is that with which motor vehicles are equipped.

The fuel tank according to the invention is preferably made of plastic.

The term "plastic" means any material comprising at least one synthetic resin polymer.

All types of plastic may be suitable. Particularly suitable are plastics that belong to the category of thermoplastics.

In particular, polyolefins, thermoplastic polyesters, polyketones, polyamides and copolymers thereof may be used. A blend of polymers or copolymers may also be used; similarly it is also possible to use a blend of polymeric materials with inorganic, organic and/or natural fillers such as, for example, but not limiting: carbon, salts and other inorganic derivatives, and natural or polymeric fibers. One polymer often employed is polyethylene. Excellent results have been obtained with high-density polyethylene (HDPE).

The wall of the tank according to this variant of the invention may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolyzed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

According to this variant of the invention (plastic tank), the tank is generally produced by molding a parison. The term "parison" is understood to mean a preform, which is generally extruded and is intended to form the wall of the tank after molding to the required shapes and dimensions. This preform does not necessarily have to be a one-part preform.

Thus, advantageously, the parison is in fact made up of two separate parts, which may be two sheets, for example. However, preferably, these parts result from the cutting of one and the same extruded tubular parison, as described in application EP 1 110 697, the content of which is, for this purpose, introduced by reference into the present application. According to this variant, once a single parison has been extruded, this parison is cut over its entire length, along two diametrically opposed lines, to obtain two separate parts (sheets).

By comparison with the molding of two separately extruded sheets, the thickness of which is constant, this approach makes it possible to use parisons of varying thickness (that is to say in which the thickness is not constant over their length), obtained using a suitable extrusion device (generally an extruder equipped with a die and mandrel, the position of which is adjustable). Such a parison takes account of the reduction in thickness that occurs during molding at certain points on the parison, as a result of non-constant levels of deformation of the material in the mold.

After a parison has been molded as two parts, these parts generally form the lower and upper walls respectively of the fuel tank.

According to the invention, the FT comprises an LVS or dead volume capable of separating the liquid droplets from the fuel vapors, of trapping them and of discharging them from the ventilation system to the tank, by draining them preferably into the swirl pot of this tank. In order to fulfill these roles, the LVS advantageously comprises an internal volume equipped with at least one baffle, chicane or other accessory that makes it possible to impose a tortuous path on the fuel vapors.

According to the invention, the LVS is connected (generally via a line known as a drain line) to a pump which enables it to be actively drained, and which is advantageously a jet pump (based on a venturi effect) as described previously. This pump may be activated by the main pump, or by the flow exiting a pressure regulator, depending on the architecture of the fuel system.

The drain line of the LVS may have any shape, subject to not generating excessive pressure drops (since these must be overcome by the drain pump).

According to the invention, an ROV brings, by default, the LVS into contact with the pump. This ROV generally comprises a housing, a float and a spring that compensates for the weight of the float and enables the latter to float as soon as a small portion of its skirt is submerged. A float made of a foamed material (like in gauge floats) gives good results.

In order to fulfill its aforementioned role, the ROV is generally located either in the bottom of the LVS, or between the LVS and the drain line, or in a vertical section of the drain line.

In practice, the ROV may be inserted in the LVS before the latter is sealed by a cover. In the case of a valve moved to the side of the LVS, it is possible to imagine a valve body integrated into the LVS or else couplings made by pipes or other types of connection, as long as these comprise a vertical section in which the float of the ROV can slide.

The present invention also relates to a process for manufacturing a plastic tank as described above. Such a tank is generally (as explained previously) fabricated by molding a parison. Hence its ventilation system, and in particular its LVS, is advantageously fastened thereto during the actual molding operation. This is understood to mean that it is either directly fastened to the inner wall of the parison, or attached to an intermediate fastening means that is, itself, directly fastened to the parison. Welding gives good results from the point of view of permeability and is practical to use within the context of this variant of the invention, since the parison is melted/softened during molding. But in order to be able to apply it, it is necessary that the plastic of the tank and that of the accessory are compatible.

Therefore, other techniques (preferably also taking advantage of the fact that the parison is melted/softened) can also be used such as rivet punching or rivet snapping, for example. This is a technique described in application WO 2006/008308 in the name of the Applicant, the content of which is incorporated by reference in the present application. In this case, preferably, the LVS is equipped with at least one orifice to make it possible to apply said technique and therefore to force the molten plastic belonging to the parison through it.

Another variant that gives good results, in particular when the material of the LVS and of the tank are not compatible, consists in equipping the LVS with at least one clip (part that is generally injection-molded and that can be clip-fastened to the LVS) made from a material compatible with that of the tank and that can therefore be attached to the parison by welding in order to fasten the LVS thereto.

Alternatively, the LVS can be attached (by welding, mechanical fastening, etc.) to another accessory that is fastened to the inside of the tank, for example: a noise reduction baffle (known as an anti-slosh baffle in the jargon of the field). In particular, when this other accessory is based on a material that is not compatible with that of the tank, this accessory is then advantageously equipped with the aforementioned clips. This variant gives good results, in particular with anti-slosh baffles.

The LVS may be fastened to the inner wall of the parison in any known manner, for example using a robot or a core (internal part of the mold, inserted between its cavities during molding, the parison then being clamped in a leaktight manner between the core and said cavities). The latter variant is preferred (in particular in the case of a two-part parison).

Finally, depending on the geometry of the tank and of its ventilation system, it may be necessary to provide at least two LVSs in said system. Thus, for example, in the case where the tank comprises at least two pockets (i.e. has a geometry such that when the volume of fuel is high, it comprises at least two vapor domes that are not in communication with one another; such a tank is often called a saddle tank), it is advantageous to provide one LVS per pocket, of which optionally one alone is active.

Figure 2:
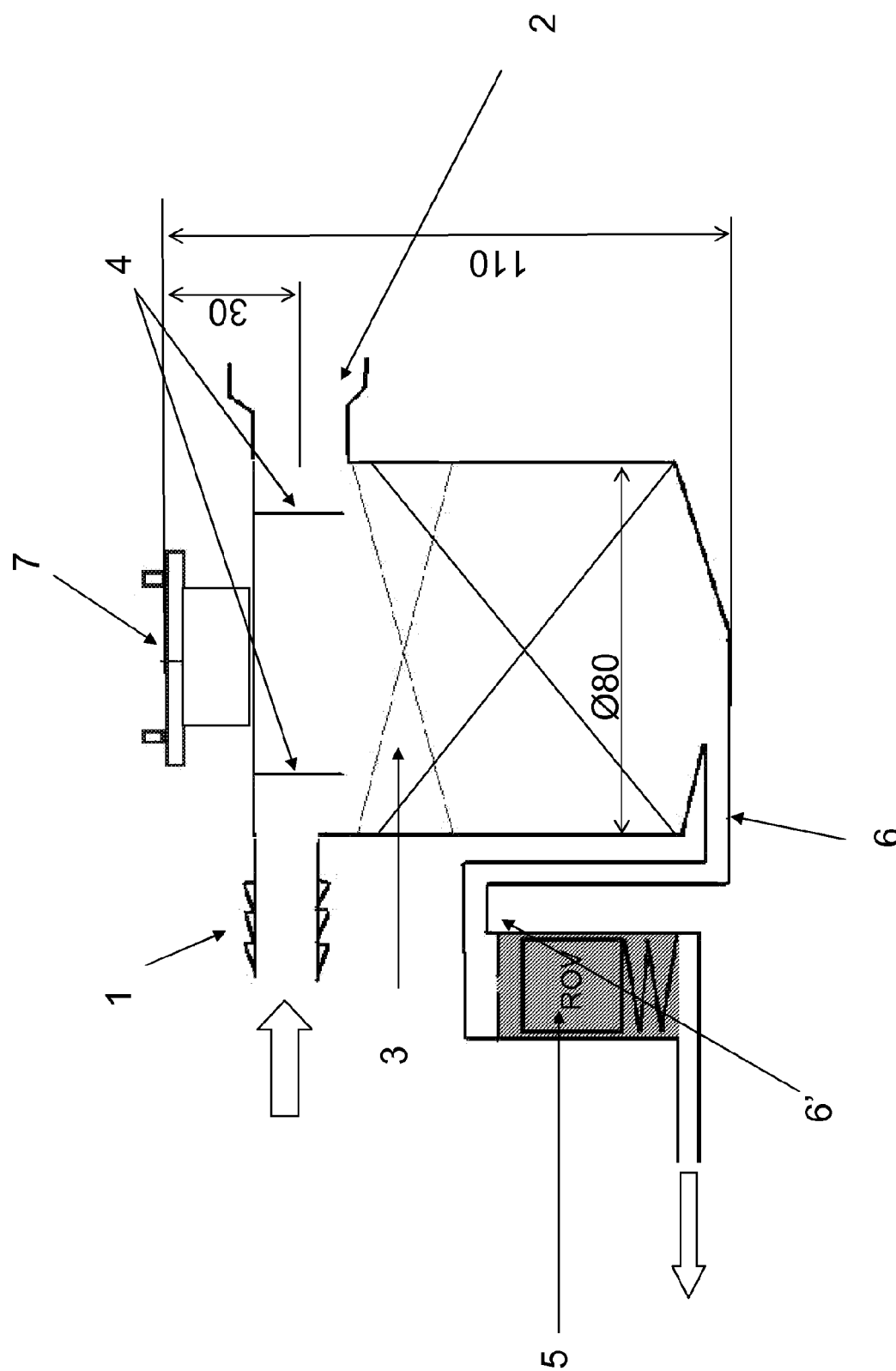
FIG. 2 illustrates a similar cross section through another variant of the invention.

The present invention is illustrated, in a non-limiting way, by FIGS. 1, 2, and 3.

FIG. 1 illustrates a variant of the invention along an axial cross section (shown schematically) through an LVS equipped with a drain line and an ROV.

FIG. 2 illustrates a similar cross section through another variant of the invention.

FIG. 3 illustrates a cross section through another variant of the invention.

In these figures, identical numbers denote identical components.

In FIG. 1, the LVS comprises a gas inlet pipe (1) intended to be connected to a ventilation line, for example via a fir-tree connection, quick connection or other connection. It also comprises a gas outlet pipe (2) intended to be connected to a canister, and also a dead volume (3) provided with a baffle (4) in its upper part that makes it possible to knock down the droplets of liquid which would be contained in the vapor. An ROV (5) is positioned under the dead volume (3), at the inlet of a drain pipe (6) connecting it to a jet pump (8). This LVS is sealed by a cover (9) and is welded to the upper wall of a tank (not represented) using a clip (7). The values (in mm) written on this figure are there by way of example.

FIG. 2 illustrates a variant where the ROV (5) has been moved into the vertical section of a chicane (6') of the drain line (6), so as to be able to increase the height of the LVS but with the same volume. In this variant, the dead volume (3) comprises 2 baffles (4); the outlet pipe (2) is no longer bent but straight and the height (thickness) of the clip (7) is greater.

In FIG. 3, a fuel tank (10) comprises two pockets (11 and 12), each of them comprising an LVS (13). Each LVS (13) comprises a gas inlet pipe, a gas outlet pipe, and a dead volume provided with a baffle in its upper part. An ROV is positioned under the dead volume, at the inlet of a drain pipe connecting it to a pump.

The oblique lines that appear in the dead volume (3) of the LVSs according to these two variants represent the liquid level when the tank is tilted respectively at 18 and 45° for the maximum usable volume defined by a manufacturer (300 ml and 140 ml respectively for the values given and the angles in question, which correspond respectively to a static situation and to a given acceleration). In other words: the LVSs illustrated make it possible to accumulate up to 300 ml of liquid under static conditions and up to a tilt angle of 18°; and up to 140 ml under dynamic conditions (where the acceleration may tilt the surface of the liquid at 45°).

The invention claimed is:

1. A ventilation system for a fuel tank, comprising:
   a drain pump,
   a liquid/vapor separator, said LVS, capable of separating liquid droplets from fuel vapors and of trapping the liquid droplets, the LVS comprising an internal volume that includes a baffle or a chicane to trap the liquid droplets, and
   a line connecting the LVS to the drain pump, the line allowing the liquid droplets trapped in the internal volume of the LVS to be drained by the drain pump, wherein the line connecting the LVS to the drain pump includes a roll-over valve, said ROV, the ROV comprising a float that blocks communication between the LVS and the drain pump if at least one of the following two conditions is reached:
   a) a level of fuel in the ROV reaches a certain height, and
   b) the fuel tank is tilted beyond a certain angle or is overturned, and
   if none of the preceding conditions is reached, the ROV is open and brings the internal volume of the LVS into communication with the drain pump.

2. The ventilation system according to claim 1, wherein the baffle or the chicane imposes a tortuous path on the fuel vapors.

3. The ventilation system according to claim 1, wherein the drain pump is a jet pump.

4. The ventilation system according to claim 1, wherein the ROV is located below a liquid outlet at a bottom of the LVS or in a vertical section of the line.

5. The ventilation system according to claim 4, wherein the ROV is inserted in the line before the LVS is sealed by a cover.

6. A fuel tank equipped with the ventilation system according claim 1.

7. A process for manufacturing the fuel tank according to claim 6, comprising:
   molding a plastic parison,
   wherein the LVS is fastened in the fuel tank during the molding operation.

8. The process according to claim 7, wherein the LVS is equipped with at least one clip made from a material compatible with that of the parison, and wherein the LVS is fastened to the parison by welding the clip to the parison.

9. The process according to claim 7, wherein the LVS is attached to another accessory in an assembly, and wherein the assembly is fastened to the inside of the fuel tank by welding a clip made from a material compatible with that of the parison with which the accessory has previously been equipped.

10. The process according to claim 7, wherein the fuel tank comprises at least two pockets, and wherein each of these pockets is equipped with an LVS.

11. The system according to claim 1, wherein the ROV includes a skirt and a spring, and wherein the spring compensates for a weight of the float and enables the float to float as a portion of the skirt is submerged.

12. The system according to claim 1, wherein the system includes a single float and the float is included with the ROV.

* * * * *